Nov. 27, 1962  R. U. BLASER  3,066,088

NUCLEAR STEAM GENERATOR

Filed April 6, 1956  2 Sheets-Sheet 2

*INVENTOR.*
Robert U. Blaser
BY
*ATTORNEY*

NUCLEAR STEAM GENERATOR

Robert U. Blaser, Alliance, Ohio, assignor to The Babcock & Wilcox Company, New York, N.Y., a corporation of New Jersey
Filed Apr. 6, 1956, Ser. No. 576,552
9 Claims. (Cl. 204—193.2)

This invention relates in general to a nuclear reactor steam generator, and, more particularly, to a pressurized water type nuclear reactor arranged for boiling within the core and having means for separating the steam from the water within the reactor vessel.

The present invention provides a nuclear steam generator which is contained within a pressure vessel, the interior of which is divided into an upper chamber and a lower chamber. The upper chamber has a steam outlet from which steam flows to a point of use. A body of water cooled fissile fuel is operably arranged to fission in the lower chamber and mechanical steam-water separating equipment is arranged in connection with the dividing means to receive the steam-water mixture from the lower chamber and to deliver separated steam to the upper chamber.

The pertinent boiling nuclear reactor is adapted for natural circulation of the water and is arranged with distinct flow paths for the steam-water mixture and the separated water to provide a steam generator of maximum natural circulation effectiveness. Consequently, this arrangement results in an improved or higher power density when compared to other boiling reactors.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which are illustrated and described preferred embodiments of the invention.

Figure 1:
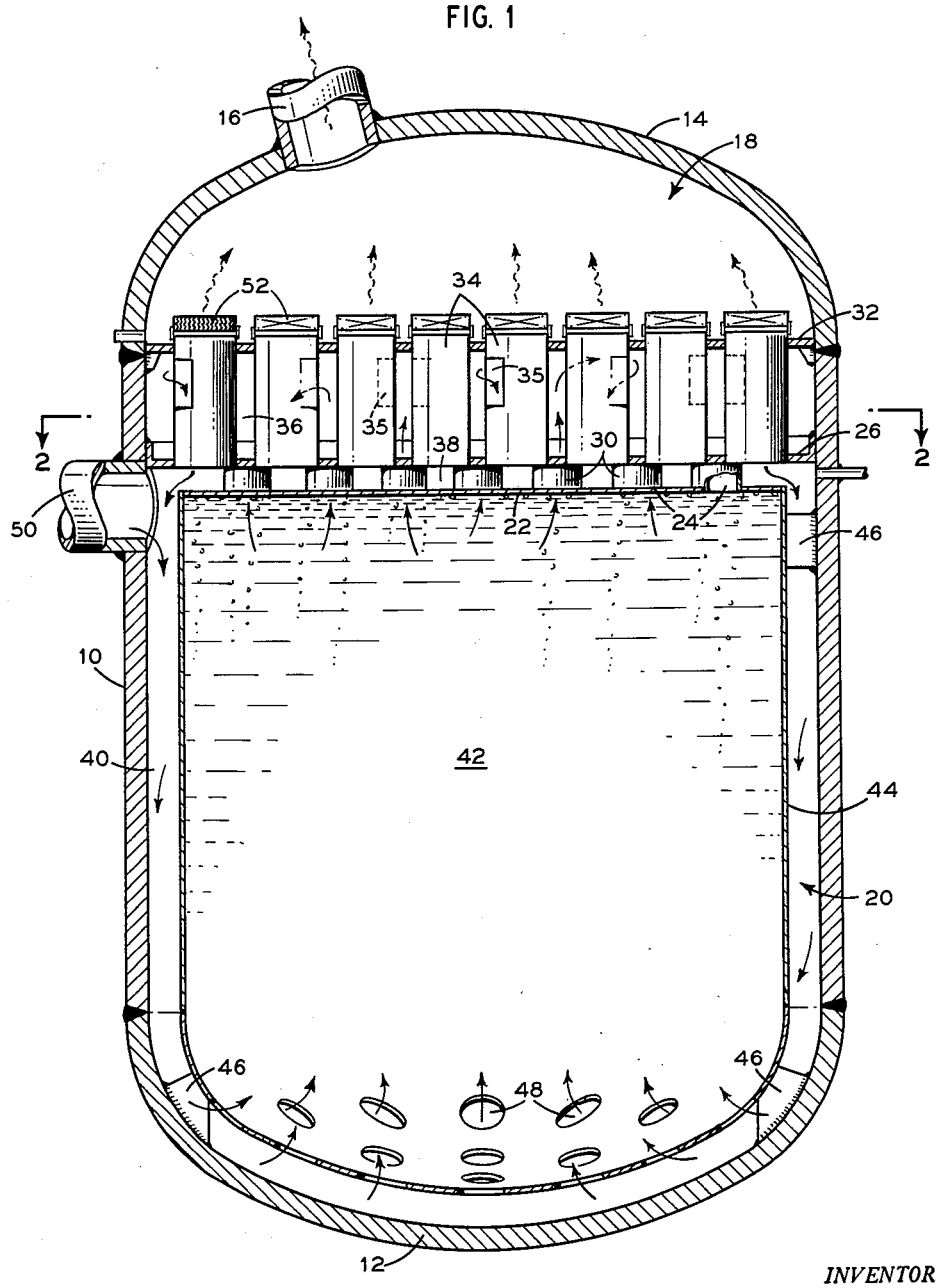
FIG. 1 is a vertical section through the nuclear steam generator.
Figure 2:
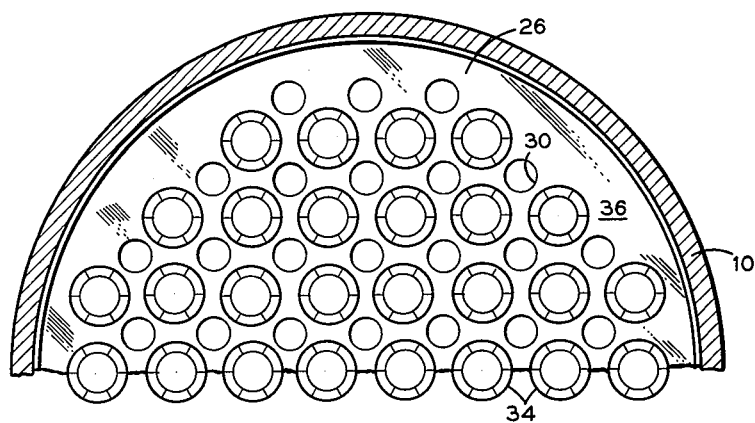
FIG. 2 is a plan section taken along the line 2—2 of FIG. 1.

In the drawings there is shown a vertically elongated pressure vessel 10 of circular cross section having lower and upper dished heads 12 and 14. There is a steam outlet 16 from the upper portion of the head 14. The interior of the vessel 10 is transversely divided into an upper chamber 18 and a lower chamber 20 by a transverse dividing means. This means includes a first diaphragm 22 which has a plurality of steam-water outlets 24 therein. Vertically spaced above the first diaphragm 22 there is a second diaphragm 26 which is secured to the walls of the pressure vessel 10 in fluid tight relationship and in which there is a plurality of openings. Fixed in the openings are flow conduits 30 which form passages from outlets 24 of the lower chamber to positions above the second diaphragm 26. A third diaphragm 32 is vertically spaced above the second diaphragm 26 and secured to the walls of the pressure vessel 10. Each of the diaphragms 32 and 26 has a plurality of openings in which a plurality of hollow upright whirl chamber steam-water separators 34 are secured in fluid-tight relationship thereto to form a steam-water mixture collection chamber 36 between the second and third diaphragms 26 and 32 and outside of the separators 34. The separators 34 are arranged to receive steam-water mixtures at their inlets 35 from the chamber 36 while discharging separated steam to the upper chamber 18 and separated water to a water collection chamber 38 formed between the first diaphragm 22 and the second diaphragm 26.

The lower chamber 20 of the pressure vessel 10 is separated into annular downcomer 40 and an inner core tank 42 by a cylindrical shaped baffle 44 which is secured in fluid-tight relationship at its upper end to the first diaphragm 22 and is positioned adjacent but spaced from the pressure vessel wall, by the supports 46. The lower end of the baffle 44 is arranged with a plurality of openings 48 to provide for the flow of separated water from the downcomer into the lower chamber at its lowermost portion. A feed water inlet 50 is provided so that cool incoming water will enter and mix with the separated liquid in the downcomer to provide a cool layer of solid water exteriorly of the core to act as a neutron reflector. This arrangement also enhances the differential pressure head of the thermo-siphonic action within the reactor.

Above the steam outlet of each separator 34 there is an auxiliary separator 52 consisting of corrugated type steam scrubbing elements to remove the last traces of moisture from the steam before it passes out the outlet 16 to a point of use.

Within the core tank 42 there is shown an aqueous body of homogeneous fissile fuel solution. When the concentration of fissile material is sufficiently high, the reactor will go critical and the resulting fission will release heat which will be absorbed by the water and which in turn will produce steam. The buoyant force of the steam causes the steam-water mixture to flow through the conduits 30 into the steam-water collection chamber 36. Thence the steam and water mixture flows at high velocity through the inlets 35 of the whirl chamber steam-water separators 34 with the resultant separated steam passing into the upper chamber 18 and the separated liquid passing out through the bottom of the separators into the collection chamber 38. The separated liquid will mix with the incoming feed liquid from the inlets 50 and passes down the annular downcomer 40 where it will again rise through the core tank or chamber 42.

The reactor of this invention can operate with either light water or heavy water and the fissile material may be either in solution or suspended in the water. Accordingly, when the fluid passes into the steam-water separators, steam will pass out the top of the separator and the water passing out the bottom of the separator will have entrained therein the fissile material. The term "water" when speaking of the fluid containing this fissile material is used only for convenience of expression and it is not to be considered in a limiting sense.

Figure 3:
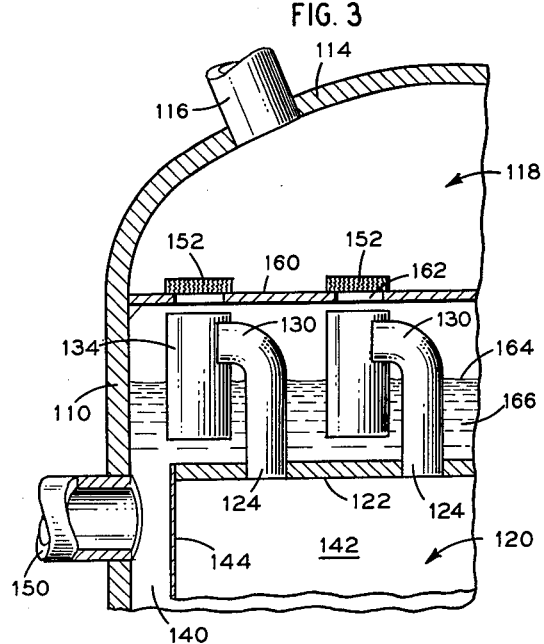
FIG. 3 is a partial vertical section of another embodiment of the steam separator arrangement of the invention.

The alternate embodiment shown in FIG. 3 as a partial vertical section utilizes the same general arrangement elements of the nuclear steam generator of FIG. 1 but has a different arrangement of the steam separators. Accordingly, the designating numerals of FIG. 3 are the same as previously described with reference to FIG. 1 with the addition of a prefix 1. The FIG. 3 embodiment involves the elongated pressure vessel divided into an upper chamber 118 and a lower chamber 120 separated by a transverse dividing means. This means includes a diaphragm 122 having a plurality of openings 124 therein to pass a steam-water mixture out of the lower chamber. The cylindrical baffle 144 divides the lower chamber into a core chamber 142 and an annular downcomer 140 in a manner similar to that shown in FIG. 1. There are a plurality of hollow upright whirl chamber separators 134 arranged above the diaphragm 122. These separators are arranged to receive steam-water mixtures from the core chamber 142 through the steam-water flow conduits 130. Another diaphragm 160 is vertically spaced above the outlets of the whirl chamber separators and has a plurality of openings 162 therein. This diaphragm is secured in fluid-tight relationship with the walls of the vessel 110. Over each of the openings 162 there is an auxiliary separator 152 consisting of a corrugated type steam scrubbing element which removes the last traces of moisture from the steam as it flows to the steam outlet 116, in the dished head 114.

In the arrangement of FIG. 3 the nuclear steam generator has a body of fissile material in the core chamber 142 and a steam-water mixture passes up through the openings 124 into the whirl chamber steam-water separators 134. The steam is passed out through the scrubber elements of the auxiliary separators 152 and the steam outlet 116 to a point of use and the separated liquid is passed out the bottom of the separators by the force of gravity and the downward directed energy of momentum resulting from the steam-water separation process. This water will seek a natural level 164 and maintain a body of water 166 above the diaphragm 122 and in the downcomer 140. The separated water will then pass down the downcomer and mix with the incoming feed liquid from the incoming feed liquid 150 under natural circulation for further steam circulation.

Although the nuclear steam generator of the present invention has been described with respect to an aqueous homogeneous pressurized water reactor, it is equally applicable to a heterogeneous pressurized water reactor in which distinct fuel elements are arranged within the core tank (42 or 142) and with which either light or heavy water is the primary cooling fluid which boils as it passes through the core.

This nuclear steam generator provides a compact arrangement where the steam separating zone is superjacent a nuclear reactor zone, with both zones contained within a single pressure vessel. Moreover, the present invention provides mechanical steam-water separation means and distinct circulation flow paths to promote the maximum power density obtainable in a natural circulation boiling reactor.

While it is illustrated and described herein specific forms of the invention, those skilled in the art will understand that changes may be made in the form of the invention covered by the claims, and that certain features of the invention may sometimes be used to advantage without a corresponding use of the other features.

I claim:
1. In a nuclear steam generator, walls defining a pressure vessel, means for transversely dividing the interior of said vessel into an upper chamber and a lower chamber, means forming a steam outlet from the upper chamber, a body of water cooled fissile fuel operably arranged to fission in said lower chamber, mechanical steam-water separation means arranged within said vessel to receive a steam-water mixture from said lower chamber and to deliver separated steam to said upper chamber, and said separation means including a plurality of hollow upright whirl chamber separators.

2. In a nuclear steam generator, walls defining a pressure vessel, means for transversely dividing the interior of said vessel into an upper chamber and a lower chamber, means forming a steam outlet from the upper chamber, a body of water cooled fissile fuel operably arranged to fission in said lower chamber, mechanical steam-water separation means arranged within said vessel to receive a steam-water mixture from said lower chamber and to deliver separated steam to said upper chamber, said separation means including a plurality of hollow upright whirl chamber separators, and downcomer means for conducting separated water from said steam-water separation means to the lower portion of said lower chamber.

3. In a nuclear steam generator, walls defining a pressure vessel, means for transversely dividing the interior of said vessel into an upper chamber and a lower chamber, means forming a steam outlet from the upper chamber, a body of water cooled fissile fuel operably arranged to fission in said lower chamber, mechanical steam-water separation means arranged within said vessel to receive a steam-water mixture from said lower chamber and to deliver separated steam to said upper chamber, downcomer means within said vessel for conducting separated water from said steam-water separation means to the lower portion of said lower chamber, and said downcomer being an annular flow passage formed by a baffle positioned adjacent but spaced from the walls of the vessel and connected with the transverse dividing means to thus form a core tank within said lower chamber.

4. In a nuclear steam generator, walls defining a pressure vessel, means for transversely dividing the interior of said vessel into an upper chamber and a lower chamber, means forming a steam outlet from the upper chamber, a body of water cooled fissile fuel operably arranged to fission in said lower chamber, mechanical steam-water separation means arranged within said vessel to receive a steam-water mixture from said lower chamber and to deliver separated steam to said upper chamber, said first named means including a diaphragm having a plurality of steam-water mixture discharge openings therein, conduits for conducting steam-water from the lower chamber through said diaphragm openings to said steam-water separation means, and downcomer means within said vessel for conducting separated water from said steam-water separation means to the lower portion of said lower chamber.

5. In a nuclear steam generator, walls defining a pressure vessel, means for transversely dividing the interior of said vessel into an upper chamber and a lower chamber, means forming a steam outlet from the upper chamber, a body of water cooled fissile fuel operably arranged to fission in said lower chamber, mechanical steam-water separation means arranged within said vessel to receive a steam-water mixture from said lower chamber and to deliver separated steam to said upper chamber, said first named means including a diaphragm having a plurality of steam-water mixture discharge openings therein, conduits for conducting a steam-water mixture from the lower chamber through said diaphragm openings to said steam-water separation means, downcomer means within said vessel for conducting separated water from said steam-water separation means to the lower portion of said lower chamber, and said downcomer being an annular flow passage formed by a baffle positioned adjacent but spaced from the walls of the vessel and connected with the transverse dividing means to thus form a core tank within said lower chamber.

6. In a nuclear steam generator, walls defining a pressure vessel, means for transversely dividing the interior of said vessel into an upper chamber and a lower chamber, means forming a steam outlet from the upper chamber, a body of water cooled fissile fuel operably arranged to fission in said lower chamber, mechanical steam-water separation means arranged within said vessel to receive a steam-water mixture from said lower chamber and to deliver separated steam to said upper chamber, said separation means including a plurality of hollow upright whirl chamber separators, said first named means including a diaphragm having a plurality of steam-water mixture discharge openings therein, conduits connecting each of said openings to a corresponding whirl chamber separator, and downcomer means within said vessel for conducting separated water from said steam-water separation means to the lower portion of said lower chamber.

7. In a nuclear steam generator, walls defining a pressure vessel, means for transversely dividing the interior of said vessel into an upper chamber and a lower chamber, means forming a steam outlet from the upper chamber, said lower chamber being geometrically shaped to fission an aqueous homogeneous fissile fuel solution and convert the resulting heat to steam entrained in the water solution, mechanical steam-water separation means arranged within said vessel to receive a steam-water mixture from said lower chamber and to deliver separated steam to said upper chamber, said separation means including a plurality of hollow upright whirl chamber separators and corrugated steam scrubbers, said first named means including a diaphragm having a plurality of steam-water mixture discharge openings therein, conduits connecting each of said openings to a corresponding whirl chamber separator, and downcomer means within said vessel for conducting separated water from said steam-water separation means to the lower portion of said lower chamber.

8. In a nuclear steam generator, walls defining a pressure vessel, means for transversely dividing the interior of said vessel into an upper chamber and a lower chamber, means forming a steam outlet from the upper chamber, a body of water cooled fissile fuel operably arranged to fission in said lower chamber, mechanical steam-water separation means arranged within said vessel to receive a steam-water mixture from said lower chamber and to deliver separated steam to said upper chamber, said separation means including a plurality of hollow upright whirl chamber separators and corrugated steam scrubbers, said first named means including a first transverse diaphragm, a second transverse diaphragm vertically spaced above the first named diaphragm to form a separated water collection chamber therebetween, a third transverse diaphragm vertically spaced above the second diaphragm to form a steam-water mixture collection chamber therebetween, a plurality of hollow upright whirl chamber separators secured between said second and third diaphragms and arranged to receive a steam-water mixture from said steam-water collection chamber while discharging separated water into said water collection chamber and discharging separated vapor to said upper chamber, and downcomer means within said vessel for conducting separated water from said steam-water separation means to the lower portion of said lower chamber.

9. In a nuclear steam generator, walls defining a pressure vessel, means for transversely dividing the interior of said vessel into an upper chamber and a lower chamber, means forming a steam outlet from the upper chamber, a body of water cooled fissile fuel operably arranged to fission in said lower chamber, mechanical steam-water separation means arranged within said vessel to receive a steam-water mixture from said lower chamber and to deliver separated steam to said upper chamber, said separation means including a plurality of hollow upright whirl chamber separators and corrugated steam scrubbers, said first named means including a first transverse diaphragm, a second transverse diaphragm vertically spaced above the first named diaphragm to form a separated water collection chamber therebetween, a third transverse diaphragm vertically spaced above the second diaphragm to form a steam-water mixture collection chamber therebetween, a plurality of hollow upright whirl chamber separators secured between said second and third diaphragms and arranged to receive a steam-water mixture from said steam-water collection chamber while discharging separated water into said water collection chamber and discharging separated vapor to said upper chamber, downcomer means within said vessel for conducting separated water from said steam-water separation means to the lower portion of said lower chamber, and said downcomer being an annular flow passage formed by a baffle positioned adjacent but spaced from the walls of the vessel and connected with the transverse dividing means to thus form a core tank within said lower chamber.

References Cited in the file of this patent

UNITED STATES PATENTS

| 2,744,064 | Moore | May 1, 1956 |
| 2,806,820 | Wigner | Sept. 17, 1957 |
| 2,815,321 | Wigner | Dec. 3, 1957 |

FOREIGN PATENTS

| 723,086 | Great Britain | Feb. 2, 1955 |

OTHER REFERENCES

International Filter Co. Publication (1926); page 10, 122/491.

Proceedings of the International Conference of the Peaceful Uses of Atomic Energy, United Nations, King, vol. 2 (1956); pages 381 and 391 Iskenderian et al., vol. 3 (1955); p. 161.

Steam, Babcock and Wilcox Co., N.Y., 37th Ed. (1955); pp. 9–11.

Harrer et al.: "International Conference on the Peaceful Uses of Atomic Energy," vol. 3, pp. 250–262, August 1955, U.N. Pub., N.Y.